No. 707,473. Patented Aug. 19, 1902.
H. H. WESTINGHOUSE.
FLUID PRESSURE BRAKE.
(Application filed Dec. 8, 1900.)
(No Model.)
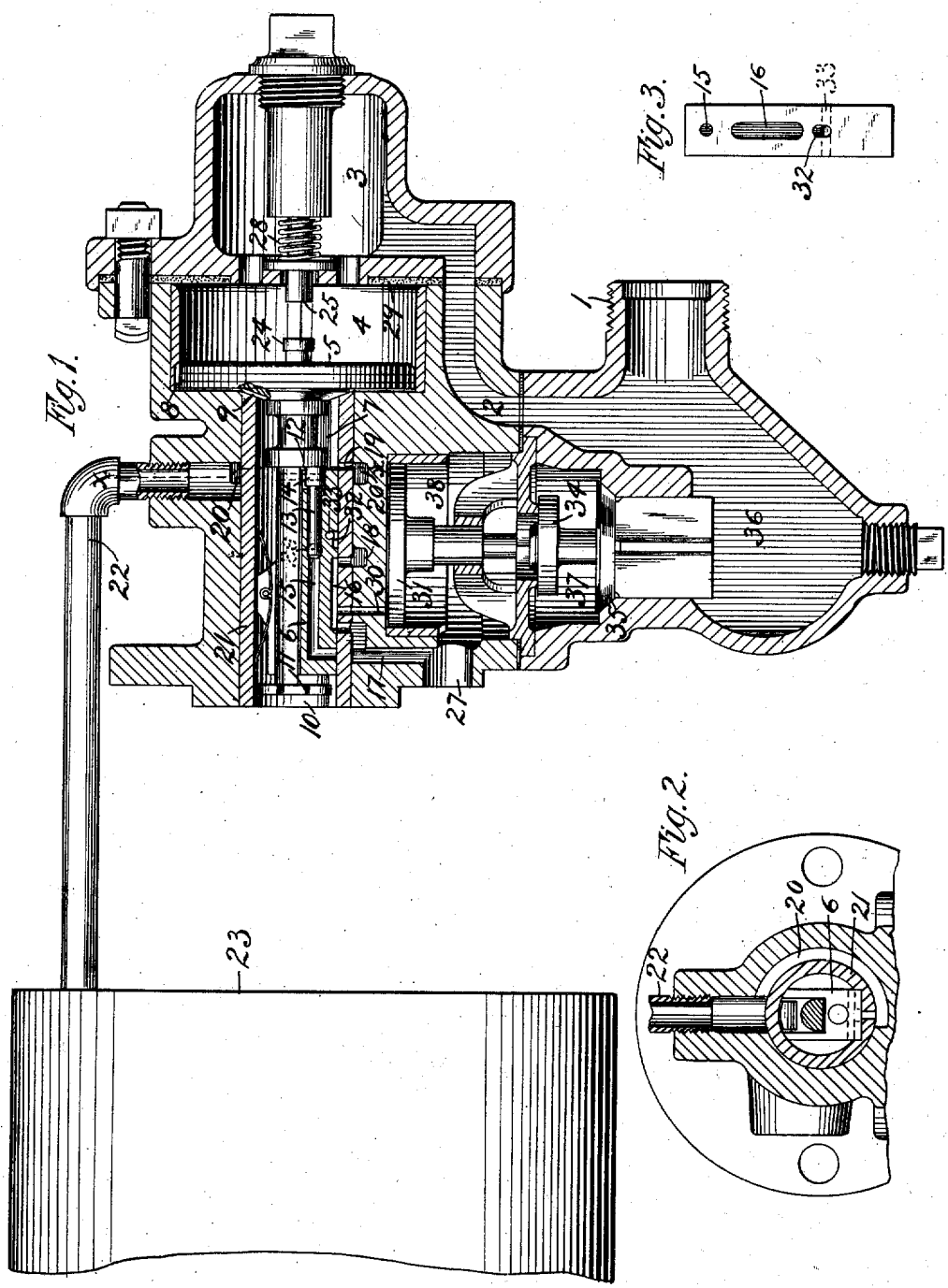
WITNESSES:
E. Wright
Jas. B. MacDonald
INVENTOR,
H. H. Westinghouse,
by F. J. Hogan, Att'y.

UNITED STATES PATENT OFFICE.

HENRY H. WESTINGHOUSE, OF EDGEWOOD PARK, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

FLUID-PRESSURE BRAKE.

SPECIFICATION forming part of Letters Patent No. 707,473, dated August 19, 1902.

Application filed December 8, 1900. Serial No. 39,182. (No model.)

*To all whom it may concern:*

Be it known that I, HENRY H. WESTINGHOUSE, a citizen of the United States, residing at Edgewood Park, county of Allegheny, State of Pennsylvania, have invented or discovered a certain new and useful Improvement in Fluid-Pressure Brakes, of which improvement the following is a specification.

The object of my invention is to provide an improvement in automatic fluid-pressure brakes for railway-cars; and it consists in the combination, with an automatic fluid-pressure brake system, of a supplemental reservoir and new and improved means by which fluid under pressure from the supplemental reservoir may be controlled and utilized in applying and releasing the brakes.

In the accompanying drawings, which illustrate an application of my invention, Figure 1 is a central vertical section through a quick-action triple-valve device constructed in accordance with my invention and connected with a supplemental reservoir, a part of which is shown in elevation; Fig. 2, a transverse section on the line x x of Fig. 1, and Fig. 3, a face view of the slide-valve of the triple-valve device.

In the embodiment of my invention as shown in the drawings I employ a quick-action triple-valve device by which in emergency applications fluid under pressure may be released from the train-pipe to the brake-cylinder; but my improvement is not limited in its application to any particular form of triple-valve device, as it may be employed with a simple triple valve or with a valve device by which the fluid under pressure from the train-pipe is released to the atmosphere or to a reservoir or other chamber or space.

The nozzle 1 of the valve-casing is adapted to be connected with the main train-pipe, and in charging the system fluid under pressure from the train-pipe flows through the passage 2 and chamber 3 into the piston-chamber 4, where it acts on the piston 5 and moves the piston and the slide-valve 6 to the left into the positions shown in Fig. 1 of the drawings. Fluid under pressure from the train-pipe is fed into the valve-chamber 7 through the feed-grooves 8 and 9 and to the ordinary auxiliary reservoir through the opening 10 at the left-hand end of the valve-chamber 7, as in the well-known Westinghouse quick-action triple-valve device. The slide-valve 6 is loosely fitted between the shoulders 11 and 12 on the piston-stem, and the graduating-valve 13 is loosely connected with the piston-stem by means of a pin 14 and controls the service-passage 15 in the slide-valve. When in the release position, as shown in Fig. 1 of the drawings, the slide-valve cuts off the supply of fluid under pressure from the valve-chamber 7 and from the ordinary auxiliary reservoir to the brake-cylinder, and a recess 16 in the slide-valve connects the brake-cylinder passage 17 with the exhaust-passage 18, leading to the atmosphere, and at the same time the right-hand end of the slide-valve uncovers a port 19 in the valve-seat, which communicates with a passage 20 around one side of the bushing 21, which is fitted in the valve-chamber 7. The passage 20 communicates, through a pipe 22, with the interior of a supplemental reservoir 23, and whenever the port 19 is uncovered communication is established between the valve-chamber 7 and the supplementary reservoir 23, and therefore when the piston 5 and the slide-valve 6 are in the release position the charging of the supplementary reservoir and of the auxiliary reservoir with air from the train-pipe will be effected simultaneously. When a slight or gradual reduction of train-pipe pressure is made for the purpose of causing a slight or graduated service application of the brakes, the piston 5 moves to the right, closing the feed-port 8, the graduating-valve 13 is unseated, and the slide-valve 6 is moved to the right, so as to cut off communication between the brake-cylinder and the atmosphere. The piston 5 continues to move to the right until the short stem 24 makes contact with the spring-pressed graduating-stem 25, and by this latter portion of the movement of the piston and slide-valve the service-passage 15 in the slide-valve will be put in communication with the brake-cylinder passage 17 and fluid under pressure from the valve-chamber 7 and from the auxiliary reservoir will flow through the transverse port 26 in the slide-valve, (shown in dotted lines,) through the passage 15 in the slide-valve, and through the passages 17 and 27 in the casing to the brake-cylinder. When the pressure in the chamber 7, which is at all times in open communication with the auxiliary reservoir through the opening 10, is reduced a little below that in the train-pipe, the piston 5 will move to the left and the graduating-valve 13 will close the passage 15 and prevent further flow of air to the brake-cylinder. It will be seen that this service application of the brakes is effected by the same operation as in the well-known Westinghouse triple-valve devices, and the further opening and closing of the graduating-valve are effected, as in the Westinghouse automatic brake system, by further reductions of train-pipe pressure and auxiliary-reservoir pressure, respectively. If the train-pipe pressure be reduced sufficiently to cause the piston 5 to traverse the full length of its stroke to the right, either by a continued gradual reduction of train-pipe pressure, as in a full service application of the brakes, or by a comparatively great and rapid reduction of train-pipe pressure, as in emergency applications of the brakes, the spring 28 will be compressed by the action of the short stem 24 on the stem 25, the piston 5 will be seated on the gasket 29, and the slide-valve 6 will be moved to the right, so that the left-hand end of the slide-valve will uncover the brake-cylinder passage 17 and also the passage 30, which leads to the upper side of the emergency-piston. At the same time the recess 32 in the slide-valve will register with the port 19 in the valve-seat, which communicates with the supplementary or reinforcing reservoir. Fluid under pressure will then flow from the valve-chamber 7 to the brake-cylinder through the passages 17 and 27, fluid under pressure from the auxiliary reservoir being supplied to the valve-chamber from the auxiliary reservoir through the opening 10 and from the supplemental or reinforcing reservoir through the pipe 22, passage 20, port 19, recess 32, and transverse passage 33, so that the brake-cylinder will be supplied with fluid under pressure from both the auxiliary reservoir and the supplementary reservoir. The same full traverse of the piston 5 and slide-valve 6 to the right uncovers the passage 30 and admits fluid under pressure to the upper side of the emergency-piston 31, which is then forced downward and unseats the valve 34. Fluid under pressure from the train-pipe then unseats the check-valve 35 and flows from the train-pipe through the chambers 36, 37, and 38 and through passage 27 to the brake-cylinder until the brake-cylinder pressure is nearly equalized with the train-pipe pressure, when the check-valve 35 will close and prevent a return flow of fluid from the brake-cylinder to the train-pipe.

In full service and emergency applications of the brakes the pressure in the supplemental or reinforcing reservoir 23 may equalize with the pressure in the auxiliary reservoir and brake-cylinder if the slide-valve 6 be held in the full service or emergency position for a sufficient length of time, and when after such application the train-pipe pressure is increased sufficiently to release the brakes the fluid under pressure in the brake-cylinder and in the chamber above the emergency-piston 31 will be released to the atmosphere through the passages 17 30, cavity 16 in the slide-valve, and the passage 18 in the casing, and at the same time the auxiliary reservoir and the supplemental or reinforcing reservoir will be recharged.

In ordinary service applications of the brakes—that is, applications in which the short stem 24 of the piston 6 merely makes contact with the stem 25 and the slide-valve is not moved far enough to the right to connect the port 19 with the recess 32 in the valve—the port 19 in the valve-seat is not connected with the recess 32 and there is no discharge of fluid under pressure from the supplemental or reinforcing reservoir, but the fluid is retained therein and remains at a higher pressure than the fluid in the chamber 7 and in the auxiliary reservoir, since the latter is partially expanded into the brake-cylinder. If after such a graduated service application, in which the auxiliary-reservoir pressure has been partially depleted, it is desired to make an emergency stop, the full pressure of the supplementary or reinforcing reservoir is still held in reserve ready for use and may be discharged into the brake-cylinder by merely causing a further reduction of train-pipe pressure, and thus moving the slide-valve to the extreme end of its traverse.

It will thus be seen that by the use of this construction a powerful application of the brakes for emergencies may be secured at any time.

What I claim as new, and desire to secure by Letters Patent, is—

1. In a fluid-pressure brake system, the combination of a train-pipe, a brake-cylinder, an auxiliary reservoir, a supplemental reservoir, a valve-chamber in communication with the auxiliary reservoir, a valve, a movable abutment for operating the valve according to variations of pressure in the train-pipe, and a port leading from the supplemental reservoir to the valve-chamber and adapted to be opened when the valve is moved either to "release" position or to emergency position, and closed when the valve is at an intermediate position.

2. In a fluid-pressure brake system, the combination with a train-pipe, a brake-cylinder, an auxiliary reservoir and a supplemental reservoir, of an automatic valve mechanism operated by variations of the pressure in the train-pipe, said valve adapted to open communication from the supplemental reservoir to the auxiliary reservoir when in "release" position and also when in "emergency" position, and to close communication from the supplemental reservoir when in an intermediate position.

3. In a fluid-pressure brake system, the combination of a train-pipe, a brake-cylinder, an auxiliary reservoir, a supplemental reservoir, a valve-chamber communicating with the auxiliary reservoir, a valve, a movable abutment operated by variations in the train-pipe pressure for moving said valve to open communication from the auxiliary reservoir to the brake-cylinder and to close communication from the supplemental reservoir, when the valve is in an intermediate position, and to open communication from the supplemental reservoir to the valve-chamber when the valve is moved either to "release" position or to "emergency" position.

4. In a fluid-pressure brake system, the combination with a train-pipe, a brake-cylinder, an auxiliary reservoir and a supplemental reservoir, of an automatic valve mechanism operated by variations of pressure in the train-pipe and adapted, when in one position, to open communication from the train-pipe to the auxiliary reservoir and to the supplemental reservoir, and when in another position to open communication from the auxiliary reservoir to the brake-cylinder and to close communication to or from the supplemental reservoir, and when in a third position to open communication from the auxiliary reservoir to the brake-cylinder and from the supplemental reservoir to the auxiliary reservoir.

5. In a fluid-pressure brake system, the combination with a train-pipe, auxiliary reservoir, brake-cylinder and supplemental reservoir, of a valve device having a movable abutment operated by variations in train-pipe pressure, a main valve actuated thereby and adapted when in release position to open communication between the supplemental and auxiliary reservoirs, and when in service position to close communication from the supplemental reservoir and to open communication from the auxiliary reservoir to the brake-cylinder, and a graduating-valve having a movement relative to the main valve for controlling the fluid-supply to the brake-cylinder in service applications.

6. In a fluid-pressure brake system, the combination with a train-pipe, auxiliary reservoir, brake-cylinder, supplemental reservoir, of a valve-chamber in communication with the auxiliary reservoir, ports leading from the valve-chamber to the supplemental reservoir and to the brake-cylinder, a movable abutment operated according to variations in train-pipe pressure, a main valve actuated thereby to open said port leading to the supplemental reservoir when in release position, and to close said port and open the port leading from the auxiliary reservoir to the brake-cylinder when in service position, and a graduating-valve actuated by said abutment and having a movement relative to the main valve for controlling the supply-passage to the brake-cylinder.

7. In a fluid-pressure brake system, the combination with a train-pipe, auxiliary reservoir, brake-cylinder, and supplemental reservoir, of a triple-valve device having a valve-chamber in communication with the auxiliary reservoir, a port leading from the valve-chamber to the supplemental reservoir, a valve adapted to open said port at both release and emergency positions and to close said port at service position, and an emergency-valve controlling a passage from the train-pipe to the brake-cylinder.

In testimony whereof I have hereunto set my hand.

HENRY H. WESTINGHOUSE.

Witnesses:
R. F. EMERY,
E. A. WRIGHT.